United States Patent
Allor et al.

[19]

[11] Patent Number: 6,138,897
[45] Date of Patent: Oct. 31, 2000

[54] SELF-ALIGINING END EFFECTOR FOR FRICTION SOLDERING METALS TO GLASS PLATE

[75] Inventors: Richard Lawrence Allor, Livonia; Samir Samir, Inkster; Tyann Sue Chappell, Bellville; Dawn Roberta White, Ann Arbor, all of Mich.

[73] Assignee: Ford Global Technologies, Inc., Dearborn, Mich.

[21] Appl. No.: 09/137,098

[22] Filed: Aug. 20, 1998

[51] Int. Cl.[7] .......................... B23K 20/12; B23K 31/02; B23K 1/06; B23K 5/20; B23K 20/10

[52] U.S. Cl. .................................... 228/114.5; 228/111.5; 228/112.1; 228/121

[58] Field of Search .............................. 228/112.1, 212, 228/111.5, 121, 122.1, 123.1, 124.1, 124.5, 124.6, 124.7, 114.5

[56] References Cited

U.S. PATENT DOCUMENTS

| | | | |
|---|---|---|---|
| 3,840,978 | 10/1974 | Lynch et al. ............................... | 29/493 |
| 5,082,162 | 1/1992 | Kamiyama et al. ..................... | 228/123 |
| 5,119,929 | 6/1992 | Carlson .................................... | 198/377 |
| 5,133,494 | 7/1992 | Wang et al. .............................. | 228/122 |
| 5,544,968 | 8/1996 | Goellner . | |
| 5,735,446 | 4/1998 | White et al. ........................... | 228/114.5 |
| 5,770,322 | 6/1998 | Nishioka et al. ........................ | 428/627 |

Primary Examiner—Patrick Ryan
Assistant Examiner—Zidia T. Pittman
Attorney, Agent, or Firm—Roger L. May; Damian Porcari

[57] ABSTRACT

Method of aligning a metallic solderable object to a glass plate comprising loading a solderable object onto an end effector of a robotically supported spindle of a spindle assembly, handing a support from the spindle assembly that extends beneath the axis of the spindle and has camming surfaces precisely aligned with the spindle axis, resiliently cradling a backing member on the support by use of a cam member adapted to fit against the support camming surface when the resiliency is overcome, positioning a glass plate on the backing member to overcome the resiliency of the backing member and cause the cam to engage the camming surfaces of the support and automatically obtain normality of the spindle axis with respect to the glass plate. An end effector assembly for facilitating friction soldering of a metal object to a glass plate, comprising a rotary spindle applicator having a support structure carrying a linearly moveable spindle along its axis, a hanging support depending from the support structure that extends beneath the axis of a spindle and carries camming surfaces precisely aligned with the spindle axis, a backing member resiliently carried on the hanging support, the backing member having a cam member depending therefrom and adapted to fit against the support camming surfaces when a glass plate is loaded onto the backing member to overcome such resiliency.

6 Claims, 2 Drawing Sheets

# SELF-ALIGINING END EFFECTOR FOR FRICTION SOLDERING METALS TO GLASS PLATE

TECHNICAL FIELD

This invention relates to the technology of friction soldering of metallic attachments to glass plates in high volume production without damage to the glass plate as a result of the simultaneous application of torsional and compression forces.

DISCUSSION OF THE PRIOR ART

Friction soldering of metal or ceramic objects to a glass plate requires spinning or vibrating an object and thence moving it into engagement with a specific location on the glass plate. This can impart both normal (compression) and torsional (or bending) forces to the glass plate. Glass plate has a high compression strength (i.e. about 15,000 psi) which can readily withstand the expected normal compression forces of the spindle applicator imposed through the metal or ceramic object. However, glass plate is very weak in bending strength and is easily cracked or damaged by bending forces as low as 10 ksi.

If the spindle of an applicator head is maintained absolutely normal to the planar extent of the attaching zone of the glass plate, rotary forces will be equally distributed on all sides of the spindle axis and thereby avoid undue bending stresses. Unfortunately, hand held friction soldering devices cannot hope to achieve such normality or preciseness even though the glass plate is separately fixtured. Friction soldering is prohibited from being used in high volume production because of its outstanding need for obtaining absolute alignment of the friction soldering spindle axis and the path of applying pressure. Such need is even more pronounced when the glass plate is pre-formed with curvature at or around the attaching zone.

SUMMARY OF THE INVENTION

The invention, in a first aspect, is a method of aligning a metallic solderable object to a glass plate. The method comprises (i) loading a solderable object onto an end effector of a roboticly supported spindle of a spindle assembly; (ii) hanging a support from the spindle assembly that extends beneath the axis of the spindle and has camming surfaces precisely aligned with the spindle axis; (iii) resiliently cradling a backing member on the support by use of a cam member adapted to fit against the support camming surface when the resiliency is overcome; (iv) positioning a glass plate on the backing member to overcome the resiliency of the backing member and cause the cam to engage the camming surfaces of the support and automatically obtain normality of the spindle axis with respect to the glass plate.

The invention, in a second aspect, is an end effector assembly for facilitating friction soldering of a metal object to a glass plate, comprising: (i) a rotary spindle applicator having a support structure carrying a linearly moveable spindle along its axis; (ii) a hanging support depending from the support structure that extends beneath the axis of a spindle and carries camming surfaces precisely aligned with the spindle axis; (iii) a backing member resiliently carried on the hanging support, the backing member having a cam member depending therefrom and adapted to fit against the support camming surfaces when a glass plate is loaded onto the backing member to overcome said resiliency.

DETAILED DESCRIPTION AND BEST MODE

Figure 1:
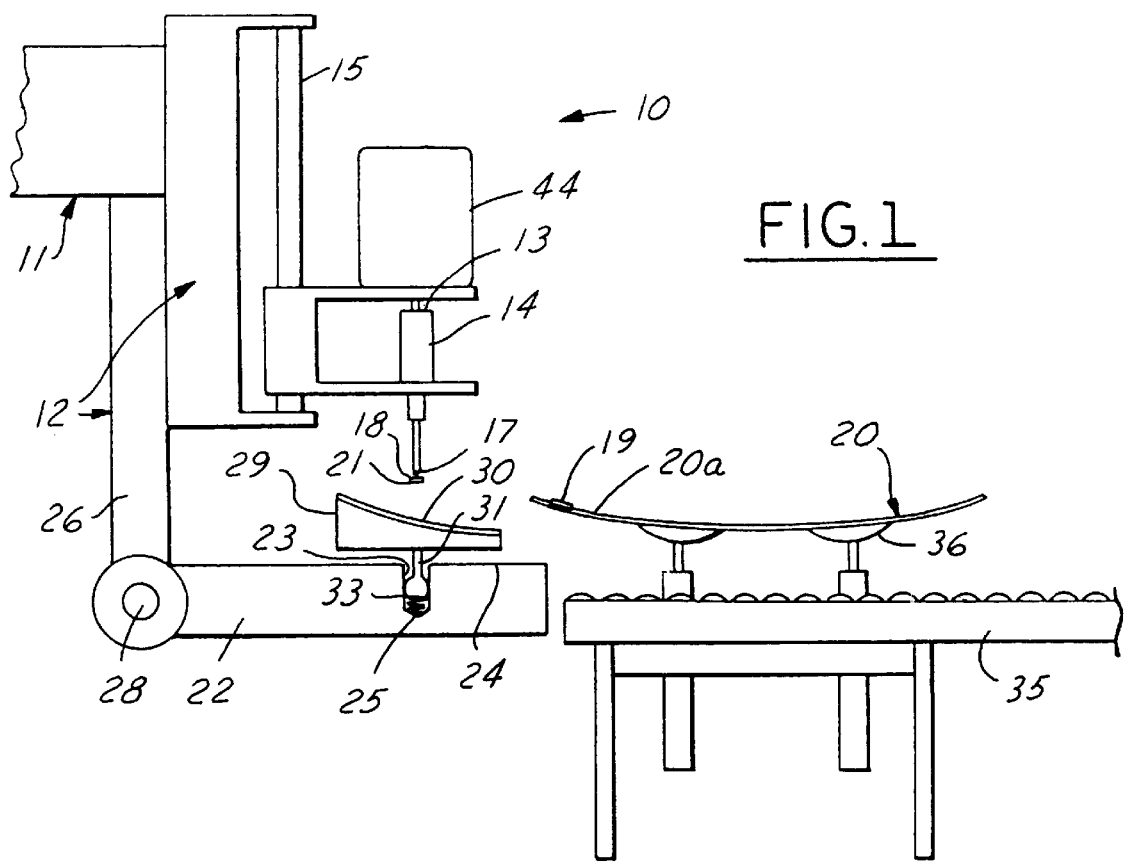
FIG. 1 is a schematic and partial sectional view of apparatus to carry out this invention, including an end effector assembly that obtains automatic alignment over the glass plate with the spindle axis.

Apparatus for carrying out the invention is shown in FIG. 1 and has an end effector assembly 10 carried on a leg of a support 11; the end effector assembly 10, in turn, carries a depending aligning support 12. The end effector assembly 10 has a spindle applicator 13 with a rotary spindle 14 moveably carried on a support structure 15 for linear movement along the axis 16 of the spindle. The spindle has a tip 17 configured to grasp a solderable object 18, such as a metallic electrical terminal 21 so that the attaching surface of object 18 is rotated and engaged with a soldering pad 19 on a glass surface 20A (or ceramic, polymer, or other non-metallic surface) to promote a friction welding of the object to the pad and thereby to the glass plate 20.

To obtain precise automatic self-alignment of the spindle axis perpendicular to the terminal attaching surface 18 and to the glass surface 20A, the depending aligning support 12 hangs from the support structure 15. The loading arm 22 is spaced beneath the spindle tip and has a cavity 23 defined in the upper surface 24 of the arm which faces the spindle tip 17 and aligns with the spindle axis 16. The aligning support 12 may take the form of C-shaped bracket having the upper arm 26 secured to the structure 15 and the lower arm 22 pivotally the arm 26. The cavity 23 has camming surfaces 25 in the form of conically tapered surfaces that are concentric to an extension of axis 16.

Figure 2:
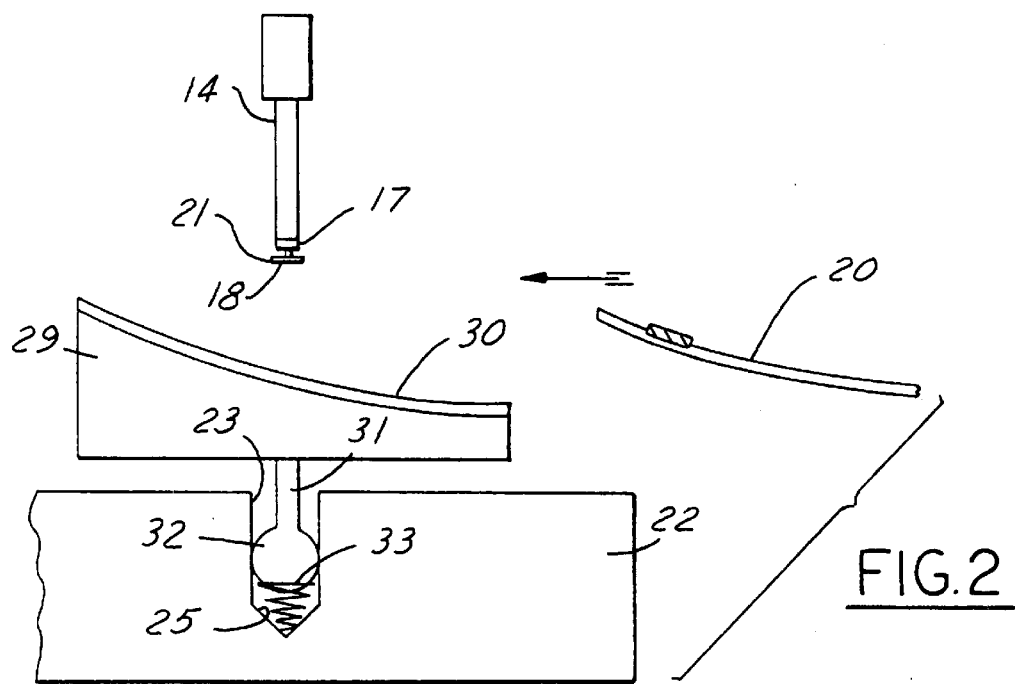
FIG. 2 is an enlarged sectional view illustrating operation of the self aligning backing plate in a first stage of operation, the backing plate constituting part of the end effector assembly.
Figure 3:
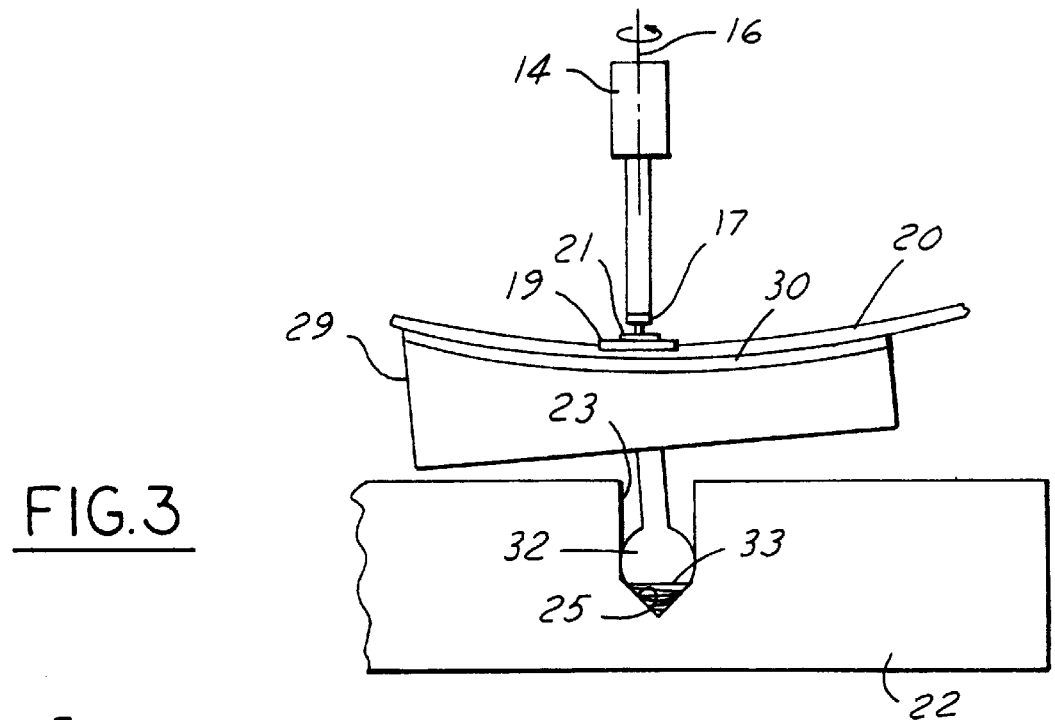
FIG. 3 is a view like FIG. 2 illustrating another stage of operation of the backing plate.

Cooperating with the cavity 23 of arm 22 is a resiliently biased backing member 29 (as shown more clearly in FIG. 2) which has an upper surface 30 that cradles the glass plate 20 when positioned thereon. The backing member 29 has a depending trunnion 31 carrying a cam member 32, preferably in the form of a ball or spherical segment; the cam member 32 is resiliently biased upward by coiled spring 33 acting between the base of the cavity and the cam member 32 or trunnion to normally separate the cam from the camming surfaces.

The glass plate 20 is carried to and positioned on the backing member by conveyor and glass positioner 35 which has suction cups 36 adapted to grip the glass plate and allow the robot to position the soldering pad 19 (on the glass plate) beneath the spindle axis, facing the terminal 21. The upper surface 30 of the backing member can be contoured to crowd a curved glass plate laid there against. The upper surface may have a soft material to facilitate this crowding.

As indicated earlier, the soldering pad 19 is deposited as a thin adherent conductive pad onto the fragile glass plate member to present a first friction creating surface. This is accomplished by coating the glass preferably with a silver based ceramic paint to form the pad. The ceramic paint can be applied by various methods and baked to form an electrical connection for any electrical or electronic device that may be attached to or embedded in the non-metallic material. The formation of the pad 19 is by a surface mounting method and must be distinguished from any method that requires the imposition of a hole into the surface of the plate glass or fragile non-metallic material. The pad can be constituted of any noble metal (such as iridium, palladium, rhodium, copper, silver and gold). It is important the conductive pad not be readily oxidizable either when exposed to the environment or when baked later to create a bond to the glass. The thickness of the pad is extremely thin, such as in the range of 0.015–0.025 inches. The exposed pad surface should preferably be flat, but because of its thinness, it can conform to the character of the glass plate upon which it is being deposited and therefore may experience slight curvature.

Figure 4:
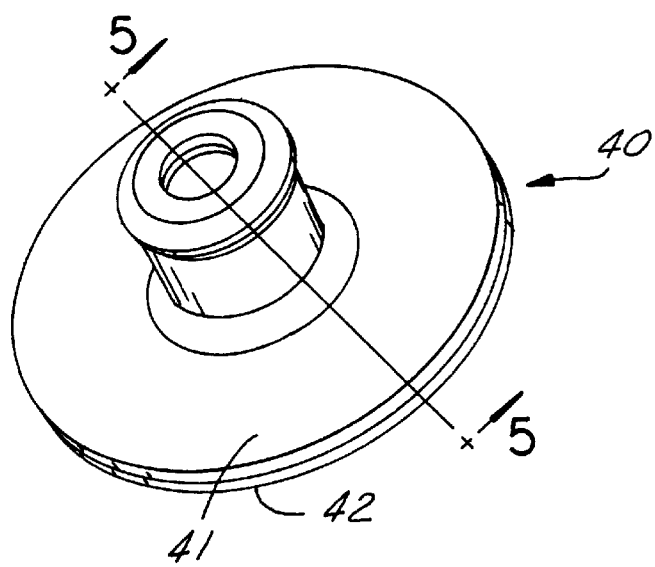
FIGS. 4 and 5 are highly enlarged views of a solderable metallic object that is loaded onto the end effector to be attached to a glass plate.
Figure 5:
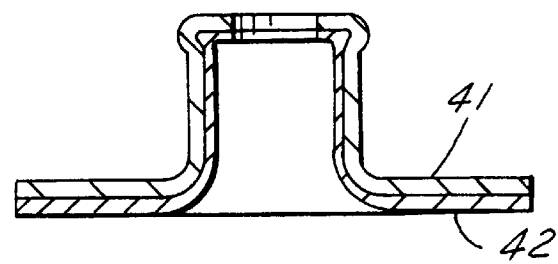

The solderable object 18 (metallic electrical terminal 21) has a mating surface conforming essential to the first friction creating surface. The soldering object, as shown in FIG. 4, may take a form of a metallic clip 40 having a flanged bottom 41 presenting an embossed or interrupted joining surface 42 which should be symmetrical about the axis of the rotation of the object during inertial welding or soldering. The solderable object may also have a solder layer applied over its bottom (rather than on the plate glass) to present the friction mating surface. When the friction mating surfaces are brought together, at least the surface of the solder will melt and form a bond when solidified.

To carry out the joining process, the solderable object is rotated on the spindle 14 by a motor 44 at a rotational velocity of at least 1700 RPM and as high as 5000 RPM or more. It is important that the friction generating surfaces of the solderable object and the soldering pad be maintained normal to the axis 16 of the spindle. The soldering object or electrical terminal, when spinning, will engage the glass plate at various radial points; if the axis of spinning is canted to the surface 24, then bending loads will be applied to the glass spaced from where the axis would intersect the surface. If the bending loads are high, as in the range of 10–15 KSI and imposed on the glass, the glass may break or be weakened with a flaw fissure. The spindle itself will impose pressure against the glass with a maximum compression load of about 140 pounds spread over the area of the friction mating surfaces.

While particular embodiments of the invention have been illustrated and described, it will be obvious to those skilled in the art that various changes and modifications may be made without departing from the invention, and it is intended to cover in the appended claims all such modifications and equivalents as fall within the true spirit and scope of this invention.

What is claimed is:

1. A method of aligning a metallic solderable object to a glass plate, the method comprising:
    (a) loading a metallic solderable object onto an end effector of a roboticly supported spindle of a spindle assembly;
    (b) hanging a support from said spindle assembly, the support extending beneath the axis of said spindle and has camming surfaces precisely aligned with said spindle axis;
    (c) resiliently cradling a backing member on said support by use of a cam member adapted to fit against said support camming surfaces when said resiliency is overcome; and
    (d) positioning a glass plate on said backing member to overcome the resiliency of said backing member and cause said cam to engage said camming surfaces of said support and automatically attain normalcy of the spindle axis with respect to the glass plate such that rotary forces applied by the spindle are equally distributed around the spindle axis to avoid bending stresses on the glass plate.

2. The method as in claim 1, in which in step (d) said glass plate is positioned on said backing member as well as bringing said solderable object into spinning engagement with said glass plate.

3. The method as in claim 1, in which said solderable object is an electrical terminal and is loaded on said spindle by a vibratory bowl feeder or robotically picked.

4. The method as in claim 1, in which said hanging support of step (b) is in the form of a C-shaped bracket with the lower arm of the bracket robotically pivotable to facilitate positioning of the glass plate onto said resiliently cradled backing member.

5. The method as in claim 1, in which said backing plate has a trunnion depending therefrom carrying a spherical segment acting as said cam.

6. The method as in claim 1, in which the camming surfaces comprise a conical cavity, the axis of which is aligned with the spindle axis, and said cavity also containing a conical coil spring normally holding said cam and camming surfaces apart.

\* \* \* \* \*